United States Patent [19]
Wojcik et al.

[11] Patent Number: 5,896,483
[45] Date of Patent: Apr. 20, 1999

[54] FLEXIBLE, LIQUID CORE LIGHT GUIDE WITH FOCUSING AND LIGHT SHAPING ATTACHMENTS

[75] Inventors: Randolph Frank Wojcik, Yorktown; Stanislaw Majewski, Grafton; Carl John Zorn; Brian Kross, both of Yorktown, all of Va.

[73] Assignee: Southeastern Univ. Research Assn., Inc., Newport News, Va.

[21] Appl. No.: 08/953,209

[22] Filed: Oct. 17, 1997

[51] Int. Cl.⁶ .................................................. G02B 6/02
[52] U.S. Cl. ............................................................. 385/125
[58] Field of Search ................................ 385/125, 124, 385/117, 142, 900; 362/555, 574, 318, 582; 600/140, 182; 606/10, 15, 20, 27

[56] References Cited

U.S. PATENT DOCUMENTS

| | | | |
|---|---|---|---|
| 4,045,119 | 8/1977 | Eastgate | 385/125 |
| 4,422,719 | 12/1983 | Orcutt | 385/123 |
| 5,165,773 | 11/1992 | Nath | 362/574 |
| 5,267,341 | 11/1993 | Shearin | 385/125 |
| 5,452,395 | 9/1995 | Schichman et al. | 385/125 |
| 5,684,908 | 11/1997 | Kross et al. | 385/125 |

*Primary Examiner*—Akm E. Ullah

[57] ABSTRACT

A liquid light guide system for ultraviolet light is disclosed that has a light shaping arrangement for the emitted light, a stable liquid core and sheath and reliable and effective end closures. The end closures include a metal crimping arrangement that utilizes two layers of deformable materials to prevent cracking of endplugs.

3 Claims, 7 Drawing Sheets

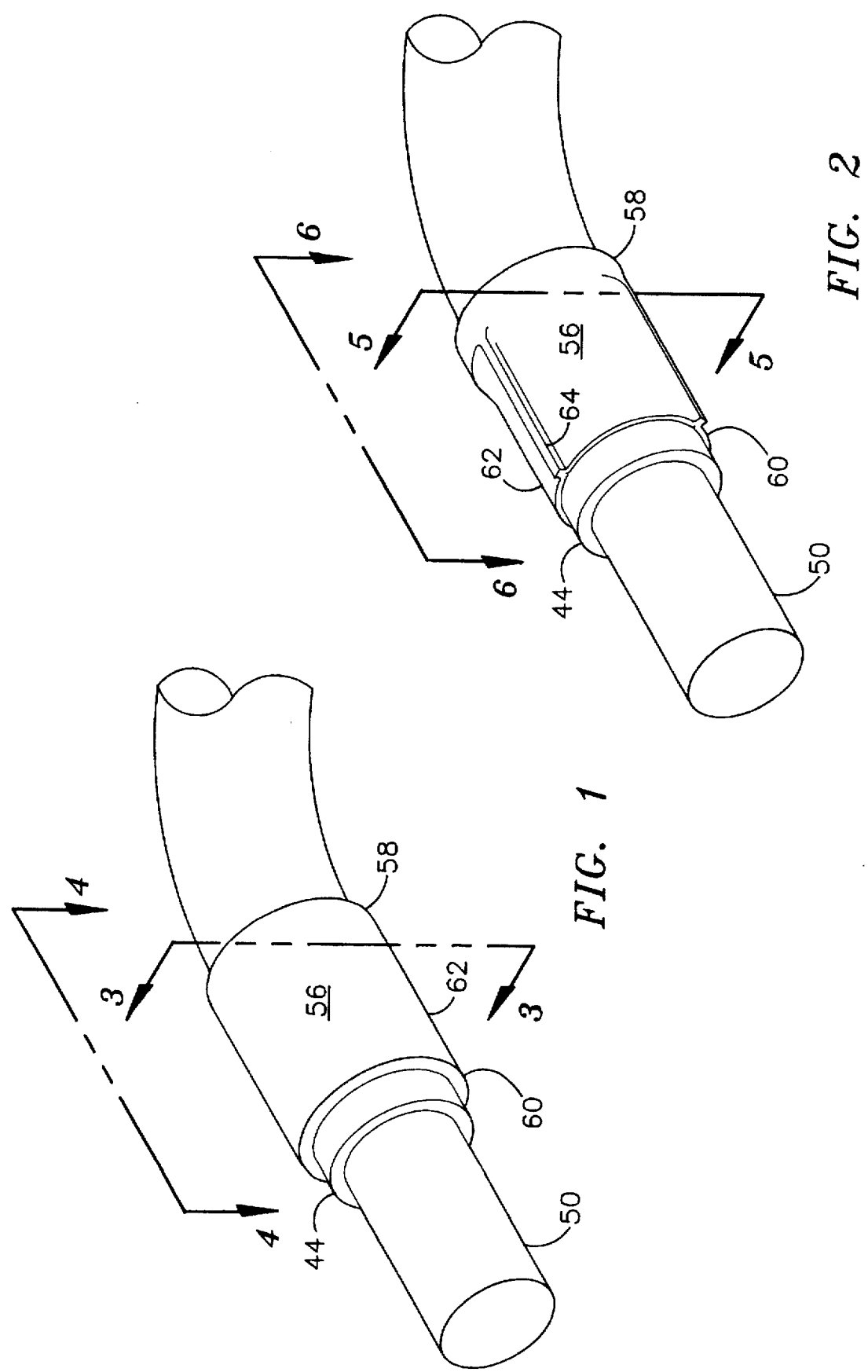

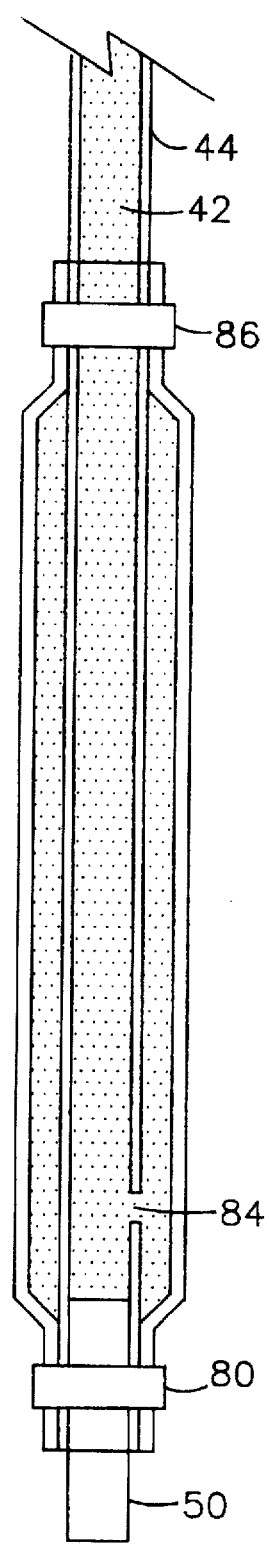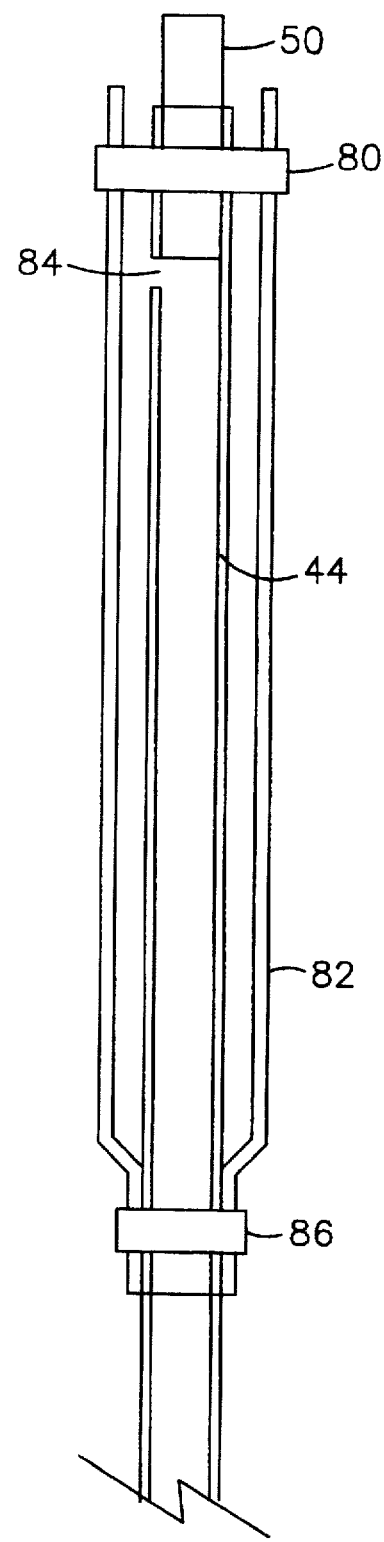
*FIG. 14*    *FIG. 15*

FLEXIBLE, LIQUID CORE LIGHT GUIDE WITH FOCUSING AND LIGHT SHAPING ATTACHMENTS

The United States may have certain rights to this invention under Management and Operating Contract DE-AC05-84 ER 40150 from the United States Department of Energy.

FIELD OF THE INVENTION

This invention relates to flexible light guides for transmitting light energy and especially ultraviolet light.

DESCRIPTION OF THE RELATED ART

Many modern assembly techniques using chemicals require the application of intense ultraviolet (320–370 nm) or blue (400–460 nm) light to the chemicals, such as the case of photocuring adhesives or polymerizing polymers. The curing time can be as short as 1–2 second with some formulations. Many of the applications involving photocuring require that the light be directed from a very intense source to a particular spot in which the chemical has been applied. At present, at least one system uses a flexible, liquid core light pipe to direct the light from the source to the desired spot of application.

Some of the problems with the present light guides used in such a system involve extreme high cost, ageing of the glass/liquid interface at the light source end due to the effects of high temperature and intense UV irradiation or both, emitted light being in a relatively broad, diffuse distribution, and the light source not being efficiently coupled to the input acceptance of the light guide.

The invention disclosed herein successfully deals with all four of the above problems, and has significant advantages over present liquid core light guide systems.

SUMMARY OF THE INVENTION

The present invention consists of three major parts: an optical arrangement at the light source designed for efficient directing of the source light into the inlet end of the light guide, an elongated flexible light guide consisting of a flexible sheath filled with an optically appropriate liquid core sealed with glass, plastic or quartz plugs at the two ends with the liquid having a higher index of refraction than the sheath, and a light shaping device at the output end designed to produce a well collimated, uniform and high intensity beam spot.

Important improvements provided by in the present invention include: the use of an inexpensive liquid core material which has desired transmission (and lack of ageing) characteristics, a simple and inexpensive optical system at either or both ends to ensure the efficient delivery of the source light into the light guide at the inlet end and to create a beam spot at the outlet end which is very collimated, and intense with the intensity being uniformly distributed over the beam spot, a method of assembling the light guide, a liquid tight sealing arrangement, and a total system of optimum components.

The light guide of the present invention uses the same optical principles as any optical fiber, that is, a sheath of an outer material (the cladding) that has a significantly lower refractive index than that of the inner liquid core material. Both materials must have sufficient transmission characteristics for the wavelength range of interest. In this invention, the sheath is economical tubing, commercially available for other purposes such as: (i) FEP Teflon tubing, or (ii) Tygon SE-200 tubing (both produced by the Norton Performance Plastics Corporation, Norton, Mass.). The former is the preferred tubing for application as an ultraviolet source because of better connections. The latter provides maximum flexibility when this is of paramount importance as the outer material is flexible and the thin inner FEP Teflon lining provides the desired low refractive index. For optical reasons, only a thin layer of the FEP material is required.

The liquid core must have high optical clarity and lack of turbidity in the desired wavelength range (especially from 300 to 500 nm for photocuring), and must have a significantly higher refractive index than that of the sheath. The liquid must be easily available and inexpensive. There are a number of liquid core materials which may be used such as: propylene glycol, ethylene glycol, mineral oil, and glycerol. However, it has been discovered that for high intensity ultraviolet a unique preferred material is a low viscosity polydimethylsiloxane having a viscosity of 10 centistokes or less. The same material of a higher viscosity has not worked as satisfactorily. CsBr in H2O and CsI in H2O are unique to this invention and form miscible solutions when mixed in order to optimize refractive index and optical transmission.

The ends of the light guide of the present invention are sealed with polished endplugs (made from quartz, glass or plastic). A special metal collar is crimped around the tubing at the endplug positions in a unique manner to reinforce the seal and provide a mechanically strong joint.

Flexible, liquid-core light guides have been used in the past (U.S. Pat. Nos. 3,740,113; 3,995,934; 4,009,382; 4,045,119; 4,286,839; 4,640,592; 4,907,133; 5,165,773; 5,333,227) but none of these references teach the present claimed invention.

The light guide attachment at the lamp end of the present invention minimizes destructive radiation effects on the light guide itself by absorbing/dissipating heat radiation and other radiation not relevant to the main function of the light guide.

The highly flexible outer plastic tubing such as Tygon support the low refractive index liner or thin-wall inner tube made of FEP Teflon obviates the need to use an external liquid reservoir as shown in U.S. Pat. Nos. 3,995,934 (Nath, 1976) and 5,165,773 (Nath, 1992). This prevents gas bubble formation in the liquid. Such bubbles act as scattering centers and adversely impact light propagation in the light guide.

The light guide may be other than round shapes. Also, small sizes may be made. For example: square extruded tubing or tubing transitioning from round to square etc. may be made and larger sizes can be fabricated such as two inches in diameter.

This invention in some instances uses a light beam shaping device for improving the light intensity distribution in the light spot. This functions to focus or defocus and/or to make the light spot more uniform. Focusing can be obtained by using assemblies of one or more lenses. This function can also be obtained or augmented by using diffusing attachments. The ultraviolet (UV) transmitting materials that can be used in the attachments are (but are not limited to): quartz, fused silica, sapphire, UV-transmitting glasses, and UV-transmitting plastics such as UVT acrylic.

The above and numerous advantages of the invention that may be achieved by the preferred embodiment will be more readily understood from the following detailed figures.

BRIEF DESCRIPTION OF THE DRAWINGS

FIG. 1 is a perspective schematic view of an end of the liquid core light guide prior to the end being crimped.

FIG. 2 is a view similar to FIG. 1 after the ferrule has been crimped.

FIG. 14 is a view similar to FIG. 13 after the other end of the expansion tubing has been crimped.

FIG. 15 is a schematic view of the end opposite to the endplug which is crimped first with an incision in the tubing made very close to the endplug.

DESCRIPTION OF THE PREFERRED EMBODIMENT(S)

The invention is an inexpensive liquid light guide that may be used for a wide variety of applications, especially those involving ultraviolet (UV) which is 300 to 400 nanometers (nm), visible light which is from 400 to 700 nm and near the infrared (IR) which is from 700 to 1400 nm. The liquid light guide uses the general optical principle of total internal reflection. Broadly, this is two concentric media with the refractive index of the inner core being higher than that of the outer cladding or sheath. The interface between the two media should be as smooth as possible to offer specular reflection, and both media should be optically transparent at the wavelength desired. The phenomenon is now well-known and does not need any further description herein.

The light transport efficiency of the liquid light guide is determined by a combination of the difference between the refractive indices of the liquid core and surrounding sheath and the absorption characteristics of the liquid at the desired spectral range.

The principle advantage of liquid light guide lies in the fact that a relatively large diameter, for example 5 mm. of liquid core can be used that is still flexible and inexpensive. Solid core light guides of plastic, glass or silica are limited to smaller diameters in order to obtain similar flexibility. The diameter of the liquid core can vary from 1 mm up to 12 mm for suitable ultraviolet transmission or may be extended even further such as on the order of two inches or larger in some applications.

One liquid light guide has been specially formulated for efficiently delivering UV light in the wavelength of 320 to 380 nm and especially the large 365 nm peak emitted by many of the commercial UV lamps used for curing or polymerizing various glues, polymers and sealants. Such a light guide will now be described with reference to the drawings.

Figure 10:
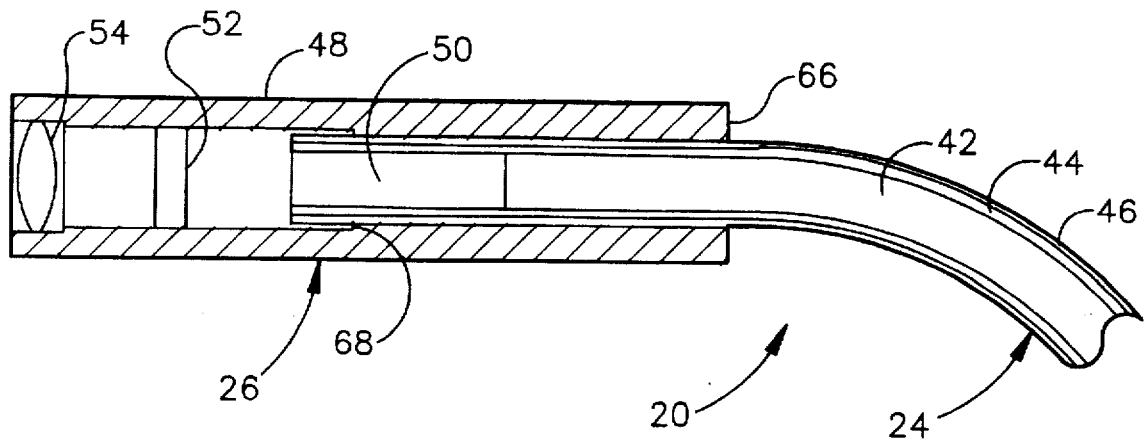
FIG. 10 shows a schematic cross-section of the end of the light guide of the present invention from which the light exits.
Figure 11:
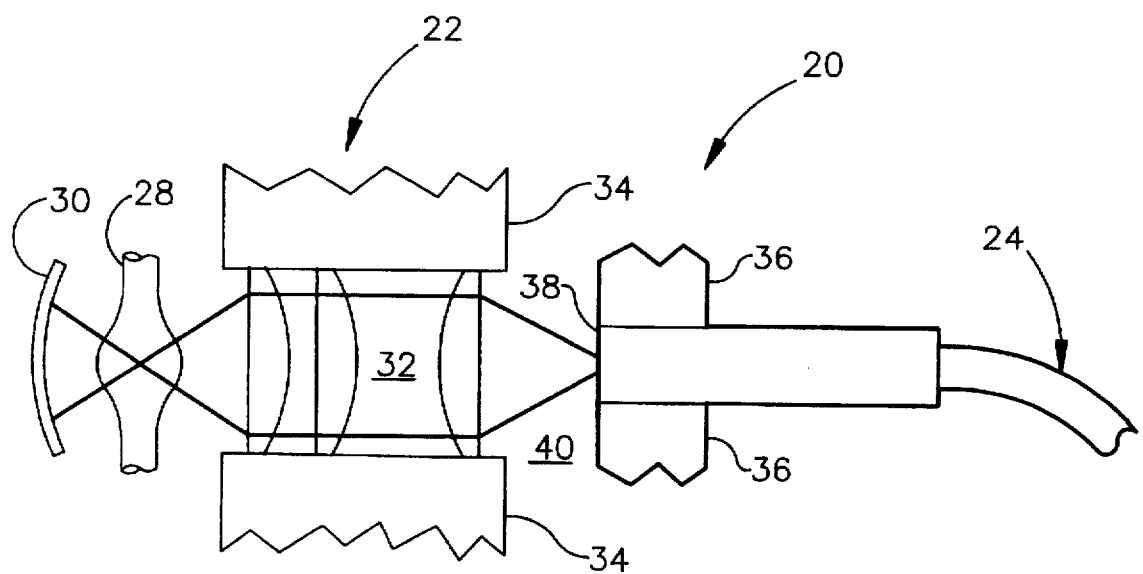
FIG. 11 is a schematic cross-section of the present invention showing the arrangement of the ultraviolet light source and other optics utilized to insert the ultraviolet light in the inlet end of the light guide.

First, with reference to FIGS. 10 and 11 taken together, there is shown a light delivery device 20 made of three principle components: the light source optical arrangement 22; the elongated flexible light guide 24; and the light shaping device 26.

With reference to the light source optical arrangement 22, there is shown a commercially available UV light source 28 well-known to those skilled in the art whose emissions to the rear are reflected by concave rear reflector 30 through a focusing lens assembly 32 held in lens holder 34 onto the inlet end 38 of light guide 24. Obviously, the front emissions from the light source are directed onto the focusing lens assembly without the need for the rear reflector. The inlet end of light guide 24 is held in light guide support 36. Since substantial heat is generated by the UV light source, a cooling aperture of 40 is provided between the focusing lens assembly and the inlet end 38.

The elongated flexible light guide 24 has a liquid core 42 surrounded by a tubular sheath 44. The choice of materials for the liquid core 42 and sheath 44 are very important because it is their difference in refractive indices and their transparency to the desired light that largely determines the efficiency of the light guide. The preferred liquid core for UV is a very low viscosity silicone polymer which is principally dimethyl polysiloxane and is available as Syltherm XLT from Dow Corning Corporation in Midland, Mich. The viscosity should be less than 10 centipoises at normal temperature. Other dimethl polysiloxane polymers have been tried and are not nearly as satisfactory as the one indicated. This material has been found to be tolerant of long term exposure from intense levels of UV light and also tolerant of wide ranges of temperature and is nontoxic.

For other than UV light, it has been found that the same liquid is satisfactory, but also mineral oil, ethylene glycol and propylene glycol. The same materials are also useable for the near IR wavelengths.

The preferred sheath FEP Teflon tubing which has a relatively low index of refraction of 1.34 to 1.35. It has been found that better seals are achieved at the end of the liquid light guide if a solid wall of the FEP Teflon is utilized even though this provides for a stiffer guide that if a composite tube was used. However, such a composite tube is satisfactory for applications where greater flexibility is desired. Such a tube would have a thin layer of Teflon on the inside with the bulk of the thickness of the tube wall being a flexible plastic such as polyvinyl chloride or similar product. A satisfactory flexible tubing would be Tygon SE-200 tubing. Both the FEP Teflon tubing and the Tygon SE-200 tubing are available from Norton Performance Plastic Corporation, Norton, Mass.

While the preferred embodiment for ultraviolet transmission is being emphasized, it is to be understood that other wavelengths may be transmitted. For example, one light guide was used for transmitting infrared energy. While the sides of the light guide itself remained cold, a black object placed near the outlet end rose to 350 degrees F.

For a preferred ultraviolet application, the light guide would be approximately 1 meter long with the inside diameter being 5 mm and the outside diameter 8 mm, leaving a wall thickness of approximately 1.5 mm. Although the solid tube wall of Teflon is preferred for sealing purposes, if the composite wall Tygon SE-200 is used to achieve greater flexibility, the inner lining would be approximately 100 to 250 microns thick. It is only necessary that the refractive index of the sheath adjacent the liquid core be less than the refractive index of the core, and the thickness of such adjacent material can be very thin when such a composite sheath is utilized. The Syltherm XLT has a refractive index of 1.390 at 20 degrees C.

Special precaution must be taken when filing the tubular sheath with the Syltherm XLT since on the one hand the tubing is easily electrostatically charged and can attract contaminating dust. Also, the Syltherm XLT has a large coefficient of thermal expansion which could cause possibly unacceptable shrinkage to occur when the guides are used at lower temperatures. The dust particles are not easily removed with normal washing or rinsing with common materials such as soapy water, ethanol, or acetone.

A clean room environment is preferred for the assembly process, but a suitable cleaning method has been developed which can be utilized in the absence of a clean room. The tubing is filled with a perfluorinated solution known as Entreflon 337 available from Entropic Systems, Inc. of Winchester, Mass. The tubing is sealed with plastic plugs and allowed to sit in a water-filled ultrasonic cleaner for 15 minutes. Afterwards, the tubing is removed from the bath, the fluid is allowed to drain, and the tubing is flushed with the perfluorinated liquid PF-5050 available from 3M of St. Paul, Minn. The rinsing fluid is allowed to evaporate at room temperature. Both fluids are nontoxic and safe to handle in a normal laboratory environment. If a clean room environment is not available, the tubing is sealed with removable plugs to prevent further contamination until the time of the final filling of the tubing with the light guide fluid. This method removes the majority of visible scattering centers visible when the fluid-filled tube is illuminated with a bright light source. With large volume manufacturing, the cleaning and rinsing fluids would be recycled and filtered within an enclosed ultrasonic bath system. The tubing would be installed within the ultrasonic bath, and the tubing filled with the Entroflon 337 cleanser. Following a period of exposure to ultrasonics, the cleanser would be flushed with the PF-5050 rinse, and the tubing removed in a clean state. Both perfluorinated fluids would be filtered and recycled for further use.

Before insertion into the tubing, the Syltherm XLT fluid is carefully degassed in an evacuated bell jar or by using ultrasonic vibration. This prevents bubble formation from dissolved gases after assembly of the liquid light guide. The fluid is pre-cooled to 0–10 degrees C. before the final assembly. This will maintain a pressurized state for the fluid during normal room temperature operations as there is substantial expansion, greater than the tubing, upon increase in temperature. Use of the light guide at very low temperatures, such as –40 degrees to 0 degrees C., requires special pre-cooling of the fluid to a level below that expected in the intended application.

Next, one end of the tubing has a transparent endplug inserted (typically 30 mm in length and 5 mm in diameter). The plug is inserted to the desired depth (at least 50% of total endplug length) and crimped into place. The tubing (if below 2 meters in length) is filled by clamping it in an upright position, and the fluid is slowly released from a glass pipette into the tubing. It is important to slowly fill the tubing to prevent the creation of trapped air bubbles. For long lengths (2 meters), a pumping system should be used to fill the tubing, although in this case, the endplugs are inserted after the completion of the fill. After the fill, the second endplug is carefully inserted to avoid any trapped air bubbles. The tube is completely filled with the liquid as when the plugs are inserted the liquid is compressed but the flexible tube can expand sufficiently to accommodate the small volume increase caused by the plugs' insertions.

The endplugs 50 at both the inlet end 38 and at the outlet end are chosen in terms of material type and constructed in order to achieve maximum throughput. For this UV application, the material of choice is Suprasil 2 synthetic fused silica available in rod form from Heraeus Amersil in Duluth, Ga. The type of glass known as BK-7 (produced by Schott Glass Technologies, Inc. in Duryea, Pa. and widely available from any optical job shop) has sufficient UV transmission and is a less expensive material, but is more expensive to fabricate into small endplugs. In the latter case, the rod must be core-drilled and all surfaces subsequently polished. For Suprasil 2, rod stock is available. In this case, the barrel of the rod is carefully ground and polished. This is subsequently cut into the correct lengths, and the ends mechanically polished. The optical quality of these endplugs is critical. Beside a well-polished barrel section, the ends must be flat and parallel, and be polished to a scratch/dig level of 40/20. Suprasil 2 is also known to have a minimum of internal defects (e.g., microbubbles) that can act as scattering centers. Finally, it is important to have a "breakedge" or chamfer added to the end surfaces. This will minimize the chance of some edge crumbling during handling, and also allows easy insertion of the endplug into the tubing. Otherwise, the wall of the tubing may be torn by the sharp edge if the endplug, again resulting in a significant loss in throughput.

An important requirement for the core fluid for use with UV is that it must be able to withstand a high intensity of UV light for an extended period of time. A preferred embodiment for one UV application is: a 1 meter long, 5 mm diameter liquid light guide of FEP Teflon tubing filled with Syltherm XLT fluid with quartz endplugs coupled to a standard UV light source (with an intensity peak at 365 nm) designed to withstand UV light for a total period of 1000 hours. During this time, the light output (as measure with a radiometer calibrated at 365 nm) should decrease by no more than 20%. At the same time, the lamp output has to be monitored since it decreases over time. For a new bulb, the light guide delivers an output of 4,200 mW/cm2 at the outlet end. During the long exposure, the output (as measured through the light guide) should not be allowed to drop below 800 mW/cm2. The system does not display any ageing due to the intense UV exposure after 1,000 hours exposures.

Other materials that may be used for the liquid core, but which are not as satisfactory for ultraviolet applications are silicone oils from General Electric Company, Schenectady, N.Y. known SF-96 in 5, 20, 50, and 100 centistoke viscosities. Also, heat or photocurable silicone systems may be used that cure into a soft, clear, solid elastomers which would prevent any leak problems. Such custom formulations can be purchased from United Chemical Technologies, Inc. in Bristol, Pa. Also, very high viscosity silicone oils above 10,000 centistokes available from United Chemical Technologies, Inc. would serve to minimize leakage problems.

A protective cover 46 is preferably a flexible metal layer covered with a black plastic, such as a low temperature heat shrinkable tubing. The cover 46 protects the liquid light guide from abrasion, heating and other damage.

Figure 3:
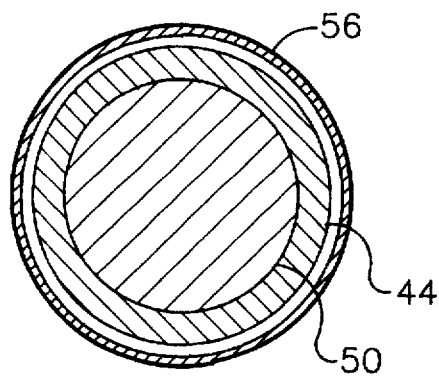
FIG. 3 is a cross-section taken on section 3—3 of FIG. 1.
Figure 4:
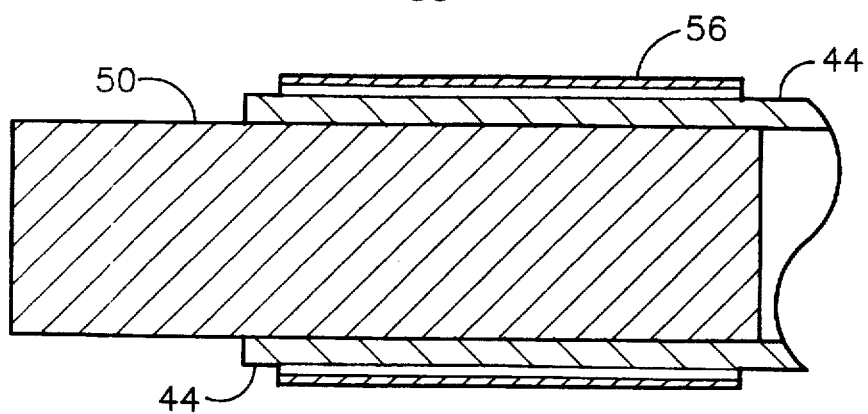
FIG. 4 is a cross-section taken on section 4—4 of FIG. 1.
Figure 5:
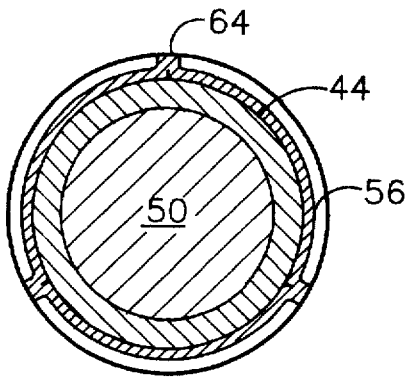
FIGS. 5 and 5a are a cross-section taken on section 5—5 of FIG. 2.
Figure 5A:
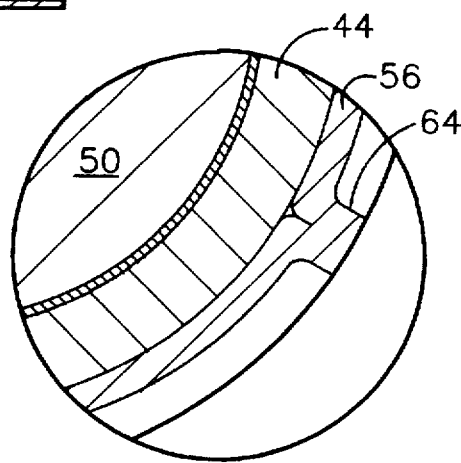
Figure 6:
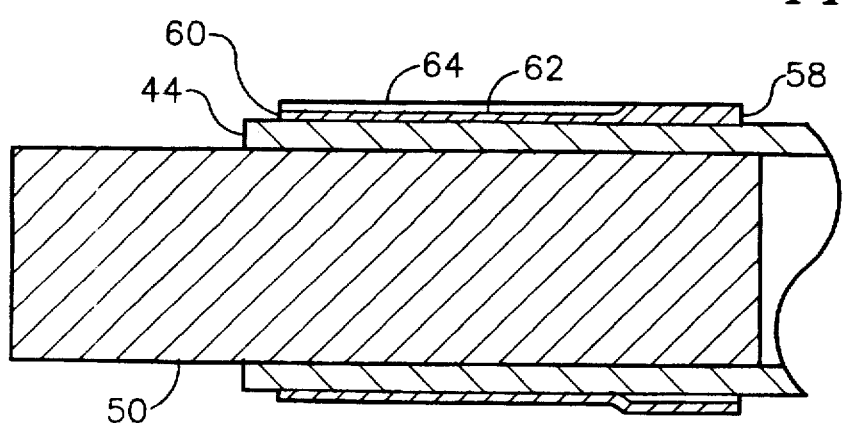
FIG. 6 is a cross-section taken on section 6—6 of FIG. 2.

A ferrule 56 is applied to encircle the sheath 44 around endplugs 50 at both ends of the light guide 24. They are not shown FIGS. 10 and 11 for purposes of clear illustration, but are shown in detail in FIGS. 1–6. Preferably the ferrule is a 3/16-inch long brass ring having a 0.014–0.020 inch wall thickness available from K. & S. Engineering in Chicago, Ill. The inside diameter is substantially the same as the outside diameter of the sheath 44. The ferrule is placed over the end of the sheath as shown in FIG. 1 prior to crimping or compressing. The metal ferrule 56 has an inboard end 58 and outboard end 60 and an intermediate section 62. The outboard end 60 is either flush or slightly inboard from the end of the sheath 44. FIGS. 3 and 4 are transverse and longitudinal cross-sections respectively with the spacing between the inside diameter of the metal ferrule 56 and the outside diameter of sheath 44 exaggerated as normally there would be no spacing. The inboard end 58 of the metal ferrule likes either flush or slightly outboard of the inboard of endplug 50 so that when the ferrule is crimped or compressed, the solid back-up of the endplug 50 extends the full length, as a minimum, of the ferrule with the relatively soft sheath 44 being compressed to act as a leak-proof gasket. With small quantities the compression is done manually using a collet, and the crimping causes an approximately 0.01-inch compression of the tubing wall which is sufficient to secure the endplug in place and provide a leak-tight seal. The crimping or compression is done in a manner that it occurs in the intermediate section 62 and optionally at the outboard end 60, but transitions into a non-compressed or non-crimped inboard end 58. This provides for a transition of stresses at the inboard noncompressed end so that there is not a sharp stress raiser created by crimping in this area and thus provides a stronger joint permitting the flexible inboard end of the light guide to flex without breaking at the joint between the inboard end of the metal ferrule and the sheath. When manually crimping using a collet, ridges 64 are created, but if such was done by rotary swage, such ridges would not be present.

Figure 12:
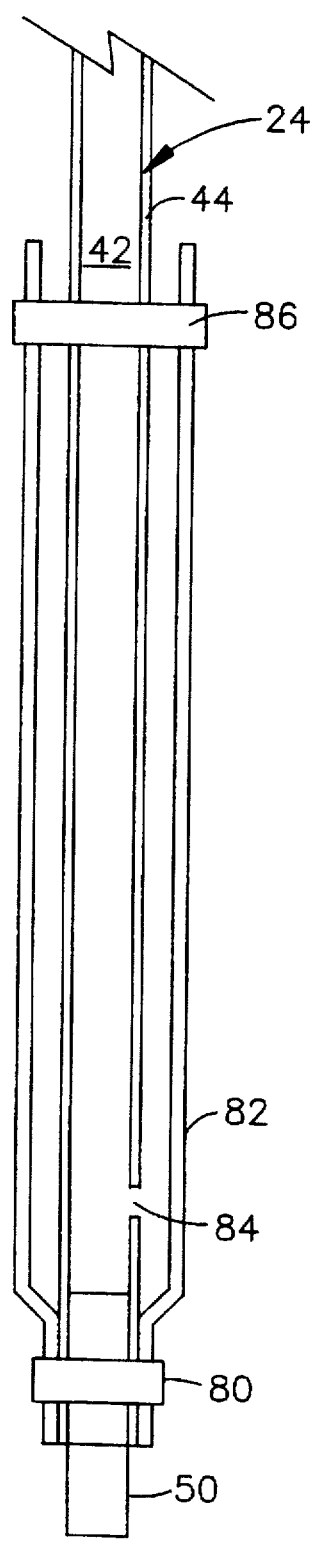
FIG. 12 is a schematic view of an end of the liquid core light guide of a second embodiment where the endplug end is crimped first.
Figure 13:
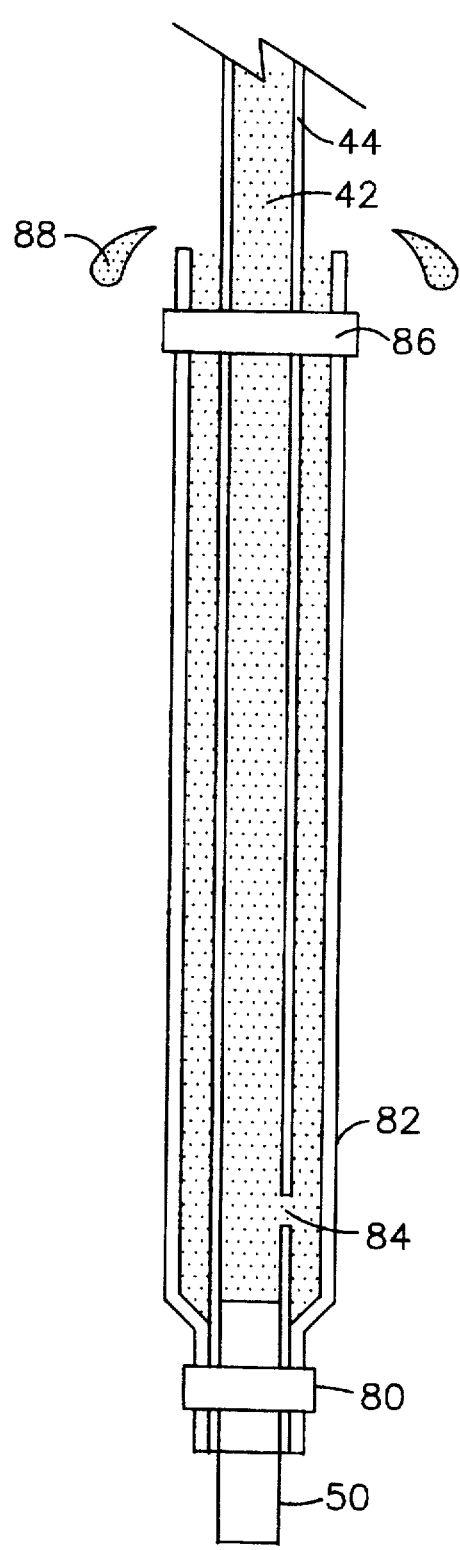
FIG. 13 is a view similar to FIG. 1 after the tubing is filled with liquid.

With reference to FIGS. 12 through 18, another preferred embodiment for the crimping and methods are shown. In FIG. 12 there is shown an elongated flexible light guide 24 with a liquid core 42, a sheath 44 and an endplug 50. The current method of crimping 3/16 inch inside diameter light guides is to use brass crimp rings 80 which are 1/8 inch long, have a 0.315 inch inside diameter with a 0.015 inch wall. This is used when a 1/4 inch inside diameter expansion tubing 82 with a 1/32 inch wall is utilized. The ring is placed on the expansion tubing and the Teflon (Registered United States Trademark) tubing or sheath 24 is utilized with the endplug 50 inserted. A small incision cut 84 is made in the sheath 44 prior to it being inserted into the expansion tubing 82. The brass crimp ring 80 is crimped by the jaws of a lathe head with the maximum closure of the jaws machined to the final needed crimp diameter. As shown in FIG. 12 the inner most brass crimp ring 86 is loosely held and in this figure the liquid core 42 has not yet been inserted. With reference to FIG. 13, the liquid core 42 has liquid added to the point that there is an overflow liquid 88 which escapes from the space between the sheath 44 and the expansion tubing 82 during the filling when the endplug 50 is in a downward position. The liquid core 42 escapes through the sheathing 44 at incision cut 84 into the space between the expansion tubing 82 and the sheathing 44. The leaking of some of the liquid core at overflow 88 insures that no trapped air remains with the liquid.

With reference to FIG. 14, there is shown a figure similar to FIG. 13 except inboard brass crimp 86 at the inboard end of the expansion tubing 82 has also been crimped so as to close off the annulus between the sheath 44 and the expansion tubing 82. The inner end of the expansion volume away from the endplug 50 needs to be crimped tight enough to keep liquid in the tubing but not so tight that it deforms the underlying Teflon tubing sheath 44. If the sheath 44 is deformed, light transmission will be reduced because some of the light will be scattered out of the tubing. It is also important that the crimping be as uniform as possible, otherwise leaks may develop. Also, the inner end away from the endplug 50 can be sealed using glue, however, this usually requires special treatment of the sheath especially if it is Teflon to make the glue stick. There is one glue that will work with such treatment, Astroseal (Trademark) made by Proseal Products in Germany. One must make sure, however, that the liquid core is compatible with any glues used. The preferred method is to use both a mechanical crimp and adhesive on glue together to insure a complete leak free crimp.

The method just described with reference to FIGS. 12–14 utilizes the techniques where the end of the expansion tubing 82 near the endplug 50 is crimped first, then the sheath is filled and the liquid allowed to leak out at overflow 88 of the uncrimped end of the expansion tubing 82 to assure that no air is trapped in it. That inboard end is then crimped using inboard brass crimp 86. Glue may or may not be applied at the option of the user.

Figure 16:
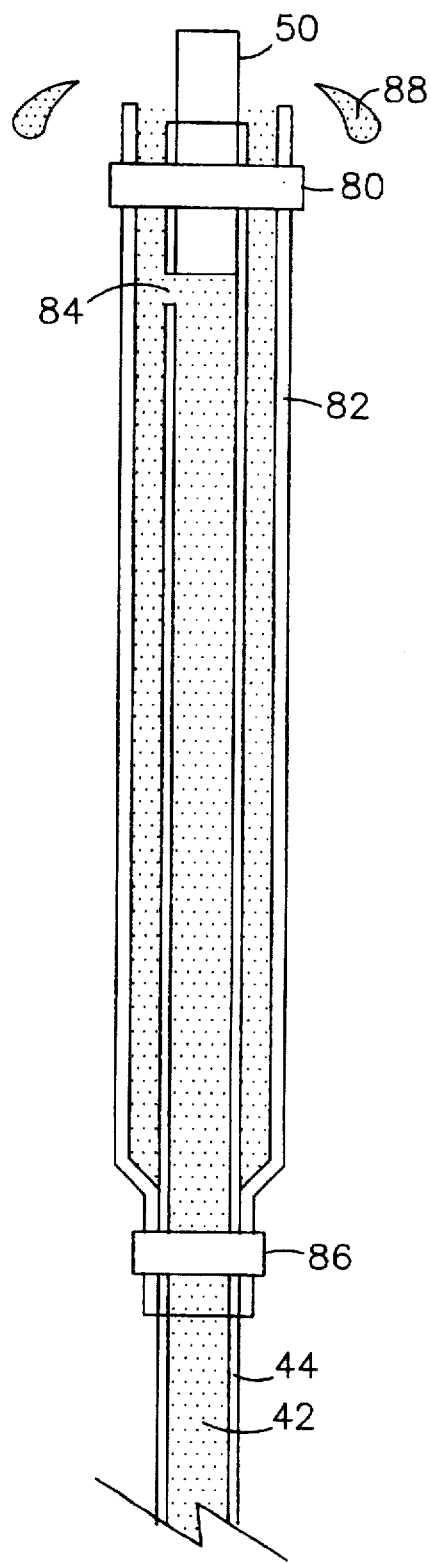
FIG. 16 is a view similar to FIG. 15 after the tubing is filled under pressure with liquid.
Figure 17:
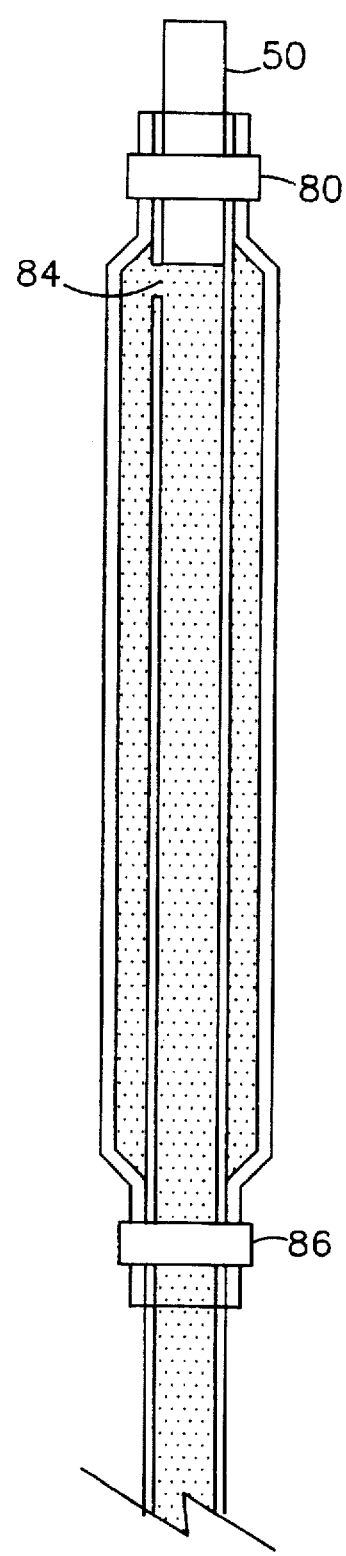
FIG. 17 is a view of the other end of the expansion tubing of FIG. 16 after it has been crimped about the endplug.

FIGS. 15–17 show an alternative technique where the end of the expansion tubing 82 away from the endplug 50 is crimped and/or glued first and the light guide sheath 44 is filled under pressure until the liquid core 42 leaks out of the uncrimped end of the expansion tubing. That end is then crimped about the plug 50. In this technique the plug is in an elevated position to permit the overflow 88.

Figure 18:
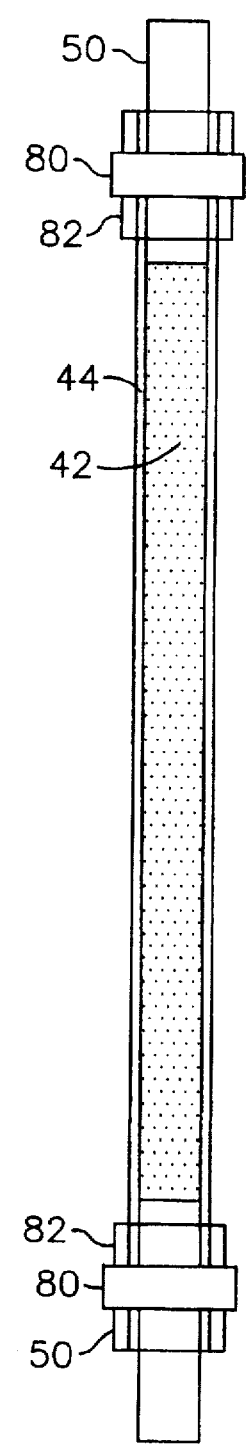
FIG. 18 is a schematic view of a short liquid light guide with a crimped endplug at each end.

FIG. 18 shows a third technique where both ends are crimped and/or glued and the tubing or sheath 44 is filled under vacuum prior to the final crimping.

It is to be noted that a very important feature shown in FIGS. 12–18 is that there are two layers of deformable material between crimp 80 and the endplug 50. The inside layer is the sheath 44 and the outside layer is expansion tubing 82. The technique shown in FIG. 18 uses a short piece of the expansion tubing which has been inserted over the sheath. This permits the application of uniform high pressure to the crimp without damaging the endplug 50. Using a metal crimping technique will sometimes crack the endplug if this layer of expansion tubing or similar layer are not utilized.

For larger diamter light guides a hydraulic hose crimper commercially available such as Gates Rubber Co's Mobile Crimp 4-20 may be utilized. The crimp rings may be made of brass, aluminum or stainless steel and of relatively thin wall (approximately 0.030 inches or less). Brass is preferred because of its strength, resistance to corrosion and easy of malleability.

With reference to FIG. 10, the light shaping device 26 has a holder 48 for the components at the outlet end of the light guide. The holder has in inside diameter on the inboard end 66 that just accommodates the light guide 24 to hold it in place. The metal ferrule is not shown for purposes of clarity but would be in the vicinity of the outboard end of the light guide to clamp the sheath to the endplug 50. The inside diameter of the holder increases at intermediate shoulder 68 so that the inside diameter of the holder is not in contact with the light guide. Located in the inside diameter at the outboard end is biconvex lens 54 and light shaper 52. These are important novel features of the invention and serve to shape the beam of light being emitted from the outlet end of the light delivery device and is especially important with the preferred embodiment which is designed to deliver ultraviolet light.

Since the output UV light is usually applied at some distance from end of the light guide, the additional optical element added to the output end maximizes the delivered effective intensity at a typical application distance. Although output intensity can be very high at the output end, the intensity decreases rapidly as a function of distance. The single biconvex lens 54 (BK-7 glass) has an F/# which close matches the numerical aperture (NA) of the light guide. (The parameters F/# and numerical aperture NA are related through the equation F/#=1/(2*N/A).) In essence, the emission cone of the light guide is matched with the acceptance cone of the lens. The numerical aperture for this light guide is 0.33 making a lens F/# of 1.5. For the lens, the F/# is the focal length divided by the lens diameter. The preferred lens has diameter of 12 mm and a focal length of 18 mm. Such lenses are transmitting UV are available from a large variety of optical component suppliers such as Edmund Scientific, Melles-Griot, or Oriel. Without the lens, not only does the intensity decrease rapidly with distance, but the resultant image spot is diffuse with a peak at the center and a radially decreasing intensity. The lens gathers the light and forms a smaller well-collimated spot with a much greater degree of uniformity.

The light exiting the endplug of the light guide retains some of the non-uniformity of the light source. To eliminate this, an inexpensive light shaper 52 is placed in the exiting light path that will eliminate this residual non-uniformity. The preferred choice is a product produced by Physical Optics Corporation (POC) of Torrante, Calif. called the Light Shaping Diffuser (LSD). It is a white light, surface relief hologram that can be embossed into a deformable material such as acrylic (including UV transmitting acrylic), polycarbonate and a variety of other plastics. The LDS can transmit up to 92% of the incoming light and will distribute it over a circular area with diffusion angles of 0.2 degrees to 102 degrees, or if preferred, into an almost unlimited range of elliptical angles. The preferred light shaper has a circular diffuses angle of 5 degrees and Part Number LSD-TON.

The preferred version for the light shaper uses a plastic substrate with the selected wavelength transmission spectrum embossed with a hologram producing the selected diffusion pattern (circular or elliptical). This optical element is placed either between the outlet endplug of the light guide and the final (biconvex) lens used to collimate the beam (preferred), or just after the lens. Applications where the user may wish to have a variety of patterns, the light shaper can be mounted within a special mount that can be removed easily, and another light shaper can be mounted with a different diffusion pattern. This can also be extended to the collimating lens itself. The lens system (whether a single or compound) can be on a movable mount such that the user can (a) adjust the distance between the lens(es) and the endplug to obtain the required degree of collimation, or (b) simply choose a different system that produces the required collimation and/or focussing of the light from the light guide.

Figure 8:
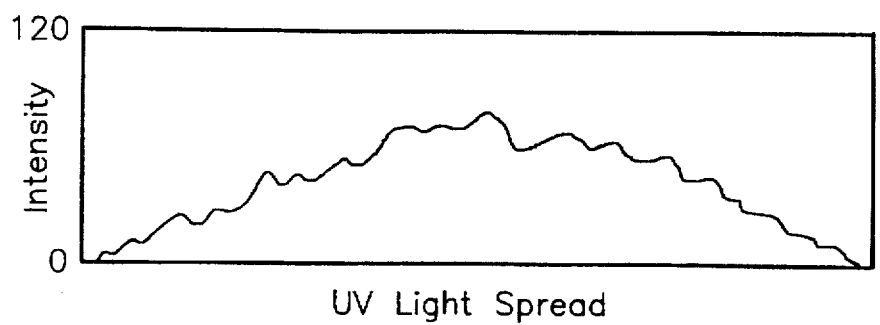
FIG. 8 is a graph showing the ultraviolet light spread versus intensity of a commercially available light guide.
Figure 9:
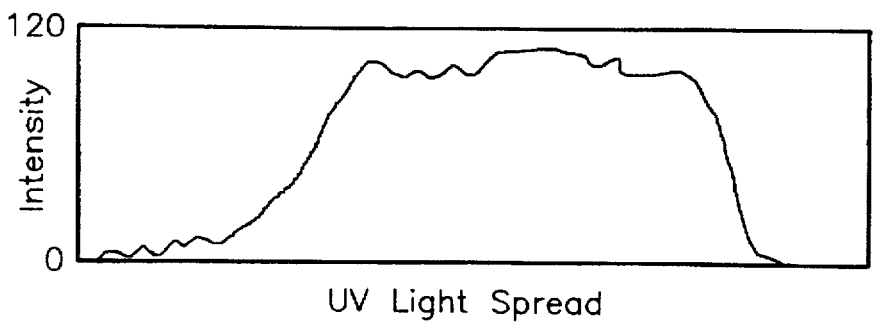
FIG. 9 shows a graph of the ultraviolet light spread versus intensity of the light guide of the present invention.

With reference to FIGS. 8 and 9, there are shown graphs of the ultraviolet light spread versus the graphs of the ultraviolet light spread versus the intensity. Without the light shaping device as provided in the present invention, the intensity across the width of the beam spreads from zero to a peak and back to zero. There is threshold level of intensity needed to accomplish curing of adhesives and other uses of the ultraviolet light. The edges of the ultraviolet in the light beam that do not rise to this threshold intensity are wasted and increase the inefficiency of the system. Utilizing the light shaping device of the present invention changes the beam to a shape shown in FIG. 9 where almost all of the beam is at uniform intensity level which is above the threshold with the fuzzy edges of the beam added to the central beam to improve the overall efficiency thereof.

Figure 7:
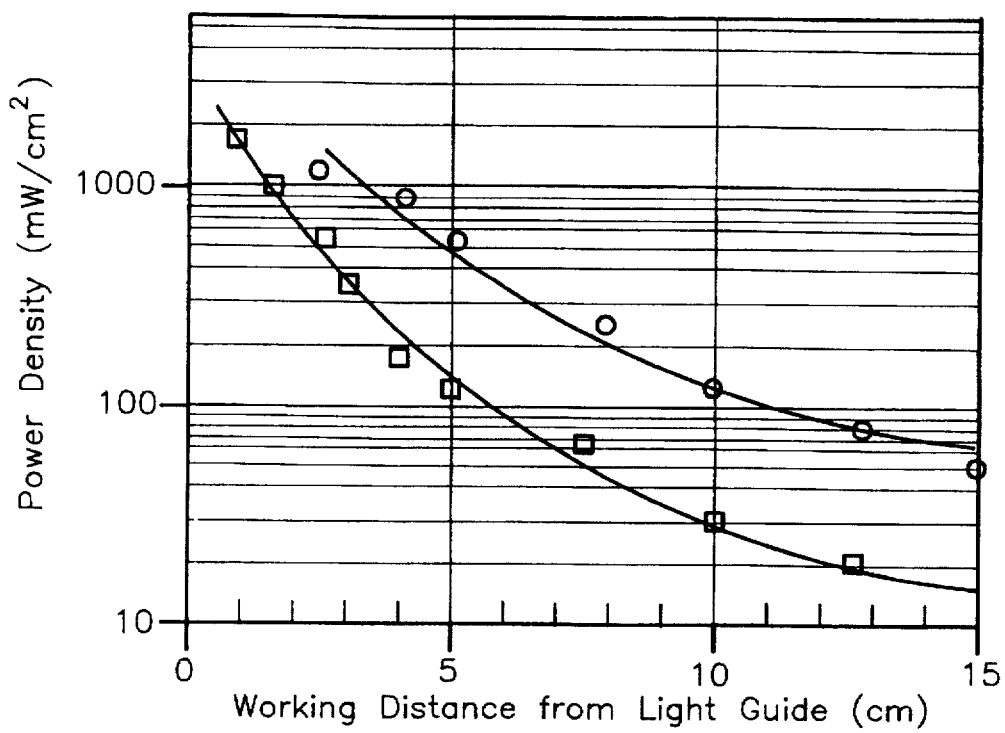
FIG. 7 is a graph showing a comparison between an existing commercial light guide and the light guide of the present invention.

With reference to FIG. 7, there is shown power density versus the working distance from the end of the light guide. The lower curve shows a commercially available light guide, and the upper curve shows the light guide of the present invention when using the preferred embodiment with the light shaping device. The light shaping device can be modified for other working distances if desired. As shown, at a distance of 5 cm, the present invention has a power density of 300 mWs per squire cm, whereas the commercial unit is slightly over 100 mWs per square cm. At a working distance slightly under 3 cm, the comparison is 1000 mws per square cm with the present invention versus 400 mWs per square cm with the commercial device. The power density of the commercial device immediately adjacent the outlet of the light guide was greater than that of the present invention.

It would be appreciated by those skilled in the art the preferred embodiment has many other applications where it is desired to transmit in a readily usable, economical and efficient manner light from a source to a remote location. The light may be ultraviolet as shown in the principle embodiment or infrared or visible light. The unique use of the liquid light guide and light shaping device assures that the emitted beam has improved efficiency by causing otherwise wasted fringe light to be included as part of the main beam. The termination utilizing the specially compressed metal ferrules and the method for providing dust-free guides and elimination of the thermal expansion problem and unique stable transmission fluid all contribute to a technology that permits numerous applications.

Many modifications and variations may be made utilizing the above disclosure. It is therefore to be understood that within the scope of the appended claims, the invention may be practiced other than as specially described.

What is claimed:

1. A light delivery device comprising:

an elongated flexible light guide having an inlet end and an outlet end;

a transmitting liquid core for said light guide;

a sheath holding said liquid having an inside index of refraction less than said core;

a hard endplug at one end of said sheath and surrounded at least in part by said sheath;

a tubing concentric with and surrounding said sheath and said plug; and a pressure band concentric with and surrounding said tubing, said sheath and said plug for applying pressure to retain said plug in said sheath and not cracking or damaging said plug.

2. The light delivery device of claim 1 wherein:

said tubing is an expansion tubing having a remote end inboard from said one end of said sheath;

a space between said tubing and said sheath; and a pressure applying ring comprising said remote end of said tubing about said sheath.

3. The light delivery device of claim 2 wherein said sheath has an opening connecting said liquid core and said space.

* * * * *